(No Model)
D. HINCHLIFFE & A. D. EDES.
APPARATUS FOR OPERATING ELECTRIC SWITCHES.
No. 558,687. Patented Apr. 21, 1896.
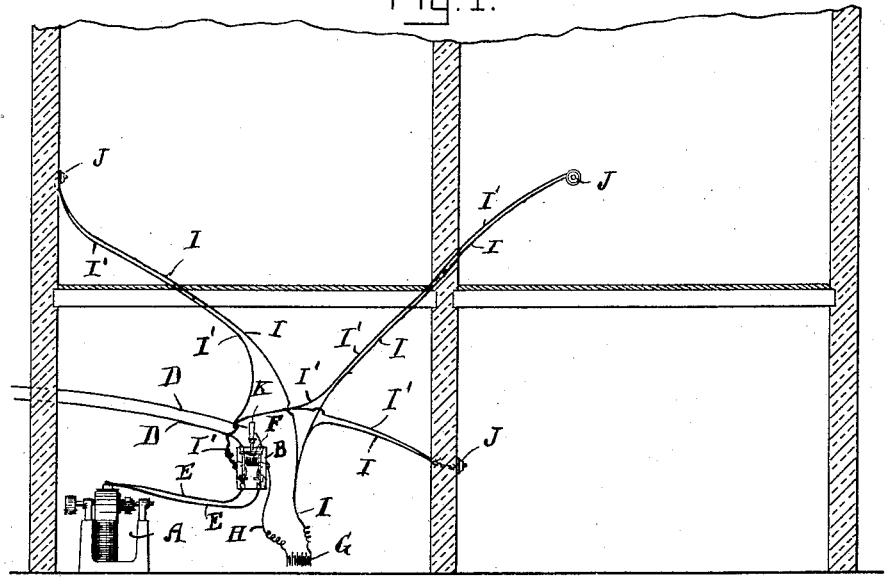
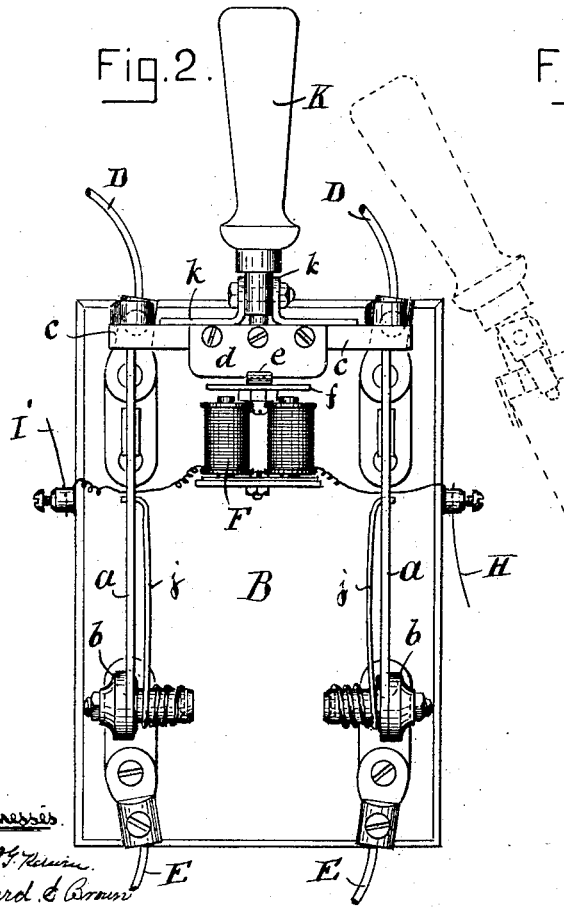
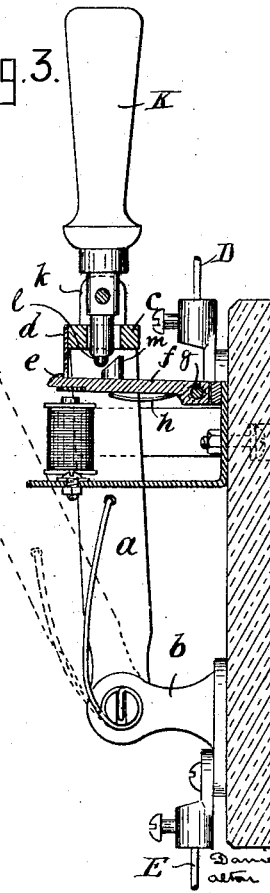

UNITED STATES PATENT OFFICE.

DANIEL HINCHLIFFE AND ALTON D. EDES, OF PLYMOUTH, MASSACHUSETTS.

APPARATUS FOR OPERATING ELECTRIC SWITCHES.

SPECIFICATION forming part of Letters Patent No. 558,687, dated April 21, 1896.

Application filed May 15, 1895. Serial No. 549,459. (No model.)

*To all whom it may concern:*

Be it known that we, DANIEL HINCHLIFFE and ALTON D. EDES, citizens of the United States, and residents of Plymouth, in the county of Plymouth and State of Massachusetts, have invented certain new and useful Improvements in Apparatus for Operating Electric Switches, of which the following, taken in connection with the accompanying drawings, is a specification.

The object of our invention is to produce an apparatus to be used in connection with an electric switch whereby the switch can be operated from any room or apartment in the building or buildings, so as to cut off the supply of electricity to the motor, thereby stopping the same.

The invention consists in attaching to an electric switch an electric magnet the armature of which is provided with a catch to hold the poles of the switch in position to form a circuit through the motor, said electromagnet being connected to a battery or other electric supply and also to push-buttons in the various rooms or apartments in the building, so that by depressing one of said buttons a circuit will be established through said electromagnet and cause the armature to be drawn down, thereby releasing the poles of the switch, thus breaking the main circuit, thereby stopping the motor.

The invention also consists in the peculiar construction of the switch-handle whereby the switch can be released by drawing said handle forward, as hereinafter fully described, and pointed out in the claims.

Referring to the accompanying drawings, Figure 1 represents a view of a building fitted with an apparatus embodying our invention. Fig. 2 is a front view of a switch fitted with an electromagnet and armature embodying our invention. Fig. 3 is a vertical section taken through the center of the switch.

A represents an electric motor; B, a switch connected to the main supply by wires D D and to the motor by wires E E. Said switch B is fitted with an electromagnet F, in connection with a battery G (or to any other electric supply) by a wire H, and the battery is by wires I in connection with push-buttons J, arranged in one or all of the rooms or apartments, which push-buttons are also connected to the switch B by wires I'.

In the drawings we have shown the poles $a$ $a$ of the switch fulcrumed to brackets $b$, and connected at their upper ends by an insulated cross-bar $c$, to which is secured a plate $d$, that is held by a catch $e$ on the armature $f$, which armature is fulcrumed at $g$ and held in the raised position by a spring $h$.

$j$ $j$ are springs for throwing the poles $a$ forward, when said catch $e$ is withdrawn by the electromagnet F, when a circuit is completed through the battery G by the depression of one of the push-buttons J or by drawing forward the handle K, that is fulcrumed in lugs or ears $k$, secured to the cross-bar $c$. The lower end of this handle is provided with a point $l$, which acts upon the level surface of a stud $m$, secured on the top of the armature $f$, which causes the said armature to be depressed, so that the catch $e$ will be free from the plate $d$. The springs $j$ will then throw the poles $a$ forward, thus breaking the main circuit and stopping the motor.

It will be seen that by the above-described apparatus the switch for cutting off the electric supply to the motor can readily be operated by depressing a button placed in any part of the building or by simply drawing forward the handle of said switch.

Although we have shown a switch with two poles it is obvious that the apparatus can be applied to any kind of switch having one or more poles.

What we claim is—

1. In combination with an electric switch, an electromagnet, an armature having a catch to hold the pole or poles of the switch in circuit, a fulcrumed handle the lower end of which is adapted to operate upon a cam-shaped projection on the top of the armature and connections between said electric magnet and a series of push-buttons whereby said switch can be released by drawing the handle forward or by depressing either of the push-buttons substantially as set forth.

2. In combination with an electric switch, an electromagnet and an armature having a catch and a cam-shaped projection, a fulcrumed handle the lower end of which is adapted to operate upon said cam-shaped projection and depresses the armature to release the catch as set forth.

In testimony whereof we have signed our names to this specification, in the presence of two subscribing witnesses, on this 27th day of February, A. D. 1895.

DANIEL HINCHLIFFE.
ALTON D. EDES.

Witnesses:
JENNIE H. PATY,
EDGAR C. RAYMOND.